Jan. 13, 1931. W. F. KASPER 1,789,003
WHEEL
Filed Oct. 26, 1928 2 Sheets-Sheet 1

INVENTOR
WALTER F. KASPER
By Paul, Paul & Moore
ATTORNEYS

Jan. 13, 1931.  W. F. KASPER  1,789,003
WHEEL
Filed Oct. 26, 1928  2 Sheets-Sheet 2

INVENTOR
WALTER F. KASPER
ATTORNEYS

Patented Jan. 13, 1931

1,789,003

UNITED STATES PATENT OFFICE

WALTER F. KASPER, OF FAIRMONT, MINNESOTA, ASSIGNOR TO FAIRMONT RAILWAY MOTORS, INC., OF FAIRMONT, MINNESOTA, A CORPORATION OF MINNESOTA

WHEEL

Application filed October 26, 1928. Serial No. 315,293.

This invention relates generally to improvements in wheels of pressed construction, and also particularly relates to a wheel of this type, formed of two parts respectively a rim and a hub section, secured together by suitable fastening devices, and providing a continuous abutting relation of the parts to hold them against movement in a direction perpendicularly to the axis of rotation. Another object is to provide a construction in which the load is transferred from a pressed steel rim directly instead of through bolts or rivets or other fastening devices.

One of the features includes the use of fastening devices merely to hold the parts together in an axial direction, and not in a direction perpendicular to the axis of rotation. Thus less accuracy is required in drilling and registration of the bolt openings if the diameter of these openings is somewhat greater than the diameter of the shanks of the fastening devices.

The invention herein is shown applied to a common form of pressed steel motor car wheel. It will be understood that in the ordinary constructions the fastening devices act to secure the parts against movement both in an axial direction and in direction perpendicular to the axis of rotation. An important feature of this invention is to abuttingly arrange the rim and the hub in such a manner as to increase the area of contact circumferentially, and make it continuous, and to have the abutting parts only co-act to carry the entire vertical load.

This invention is an improvement over my prior patents, respectively numbered 1,615,709 and Reissue No. 16,520. One of the main features herein, differing from those shown in the patents mentioned, is the increasing of the area of abutting contact between the hub and the rim, and at the same time retaining all the advantages of the construction shown in the patents referred to.

Features and advantages of the invention will appear in the description of the drawings forming a part of this application, and in said drawings Figure 1 is a face view of a wheel illustrating an embodiment of the invention;

Figure 1:
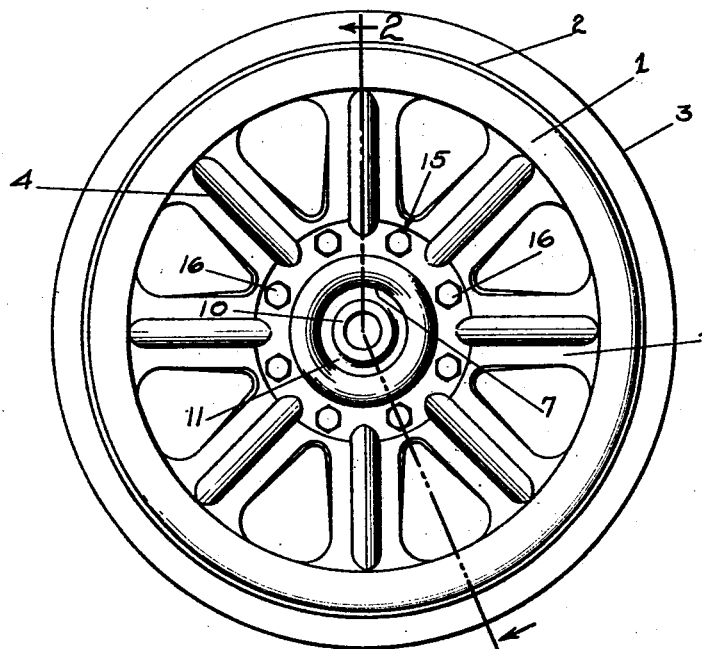
Figure 2:
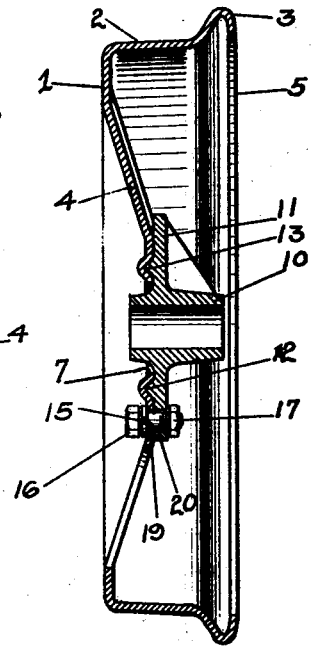
Figure 2 is a section on line 2—2 of Figure 1.

Referring first to that form of the invention shown in Figures 1 and 2. One of the advantages of this embodiment is that it permits formation of those abutting portions which secure the rail-engaging and hub sections against movement in a direction perpendicularly to the axis of rotation by pressing and casting respectively, so that it is unnecessary to machine either part. Therefore a very cheap construction is produced, for increasing the area of abutting contact.

The numeral 1 generally indicates a form of pressed steel motor car wheel, having a tread portion 2, a flange 3, and a spoke-forming portion 4. The wheel is open at the flange side as shown at 5. The spoke-forming portion is provided with a central opening 7. The hub is indicated at 10 and is provided with a plate-like flange 11 lying in a plane perpendicularly to the axis of rotation. The cooperative relation of this flange with the spoke-forming portion is an important feature of the invention. The hub has a portion passing loosely through the opening 7. At the time of forming the wheel the portion 4 is provided with a circular indentation providing a socket or groove 12. The hub is formed by casting and is provided on one vertical face with a complemental circular projection 13, which cooperates with the indentation to provide a substantially large area of contact, and to secure the elements against movement in a direction perpendicularly to the axis of rotation of the wheel. By the means just described the load is transferred, through a large area of contact, from the hub directly to the rim by means of the cooperating elements 12 and 13, instead of through rivets or other fastening devices. As practiced herein the fastening devices, in this instance bolts 15, each having a head 16 and a threaded nut 17, pass loosely through openings 19—20 respectively of the rim and hub. Less accuracy is thus required in drilling and registration if the diameter of the bolt openings is somewhat greater than the diameter of the shank of the fastening device. This is also a feature but there is no intention to be limited to the particular kind of fastening device or the manner of applying, the invention broadly consisting of abuttingly engaging the wheel and hub and providing a substantially large area of engagement for the purpose set forth.

Figure 3:
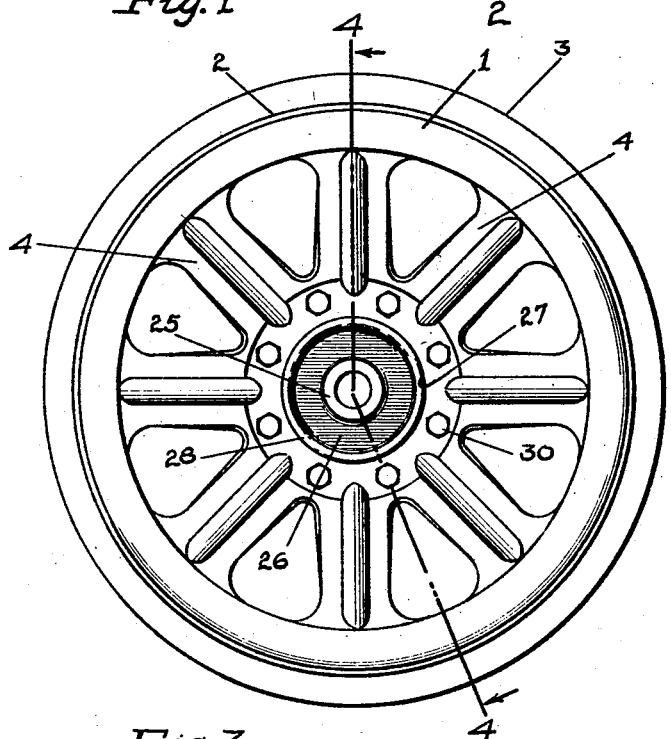
Figure 3 is a face view of another embodiment of the invention.
Figure 4:
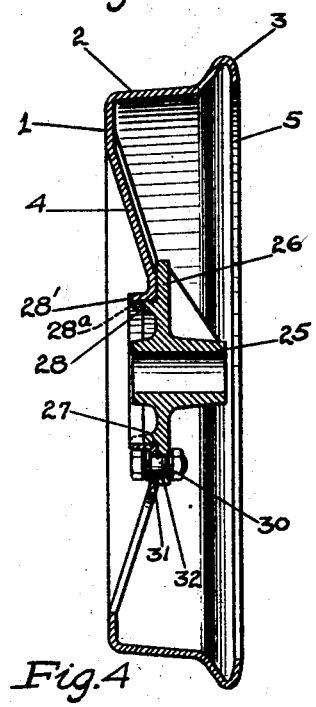
Figure 4 is a section on line 4—4 of Figure 3.

That embodiment of the invention shown in Figures 3 and 4 lends itself to casting or forging insofar as the hub is concerned, the opening of the spoke-forming rim extension can be machined or punched to obtain a proper fit and even distribution of the load at the point of abutting engagement. The hub is indicated at 25 and has a flange 26 corresponding substantially to the flange 11. The opening in the spoke-forming section is indicated at 27. The circumferential shoulder 28 is formed on the hub by casting, and it has been found advisable to at least machine the load-carrying or engaging surface of the hub. As in the first case, the area of engagement is increased by giving a relatively large circumferential area to the shoulder. A fastening device indicated at 30 passes loosely through openings 31—32 respectively of the wheel and hub.

Figure 5:
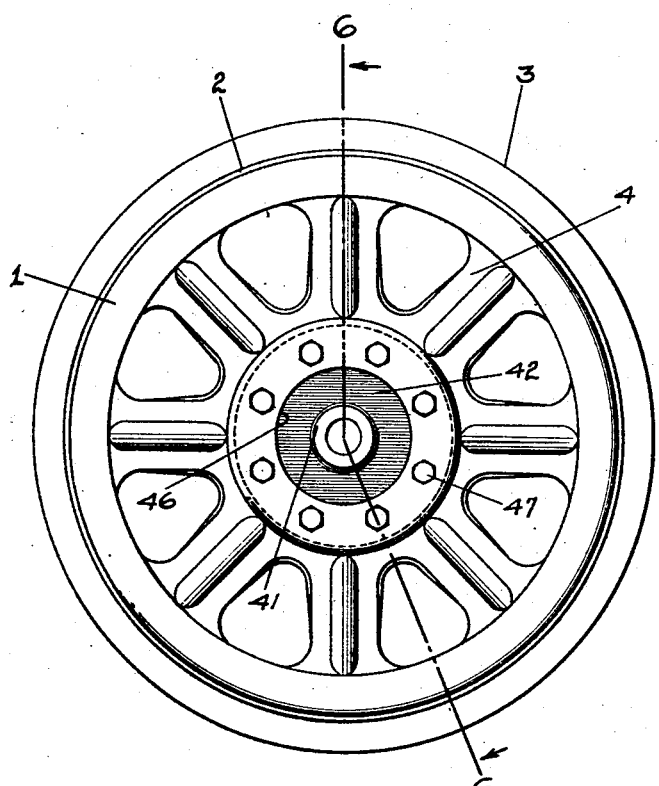
Figure 5 is a face view of a third embodiment of the invention.
Figure 6:
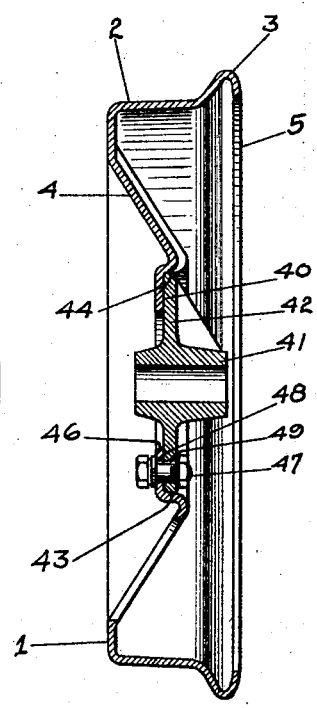
Figure 6 is a section on line 6—6 of Figure 5.

In the embodiment shown in Figures 5 and 6, the circular indentation or pocket 40 can be formed by pressing when the wheel is made. The area of the shoulder can, in this instance, be increased in an axial direction as well as circumferentially. The hub is indicated at 41 and the hub flange at 42, the periphery of the flange 43 engaging the shoulder 44 formed by the cavity or depression 40. The opening of the spoke-forming portion is indicated at 46. A fastening device 47 passes loosely through openings 48—49 respectively in the wheel and hub. The thickness of the flange can also be increased to correspond to the increased depth of the pocket. This is also true of the form shown in Figure 2, in which both groove and projections can be enlarged in an axial direction.

Again referring to Figure 4. In order to increase the area of contact in an axial direction a flange is formed on the wheel as at 28'. This flange is a tubular extension in a direction toward the outer side of the wheel. A feature of the invention. The circumferential shoulder 28 is also extended in correspondence to the extension 28' to increase the area of contact between the two elements in an axial direction. This extension of the flange 28 is indicated at 28ª.

In all forms of the invention, the area of contact can be increased in a direction axially of the wheel, and also can be increased by increasing the diameter of the circumferential shoulder, or in other words by placing this shoulder at greater distance outwardly from the axis of rotation.

I claim as my invention:

1. A device of the class described comprising rail-engaging and hub sections having a continuous circumferential abutting engagement to secure them against movement perpendicularly to the axis of rotation, and quickly removable means acting to prevent separation of the sections in an axial direction.

2. A device of the class described comprising rail-engaging and hub sections, said sections having means cooperable to obtain a continuous circumferential abutting engagement to secure them against movement perpendicularly to the axis of rotation, the abutting portion of the rail-engaging section having the form of a circumferentially continuous pressed indentation, and means acting only to prevent separation of the sections in an axial direction.

3. A device of the class described comprising rail-engaging and hub sections, said hub section having a flange and said flange having a circumferential lateral shoulder, and said rail-engaging section having means engaging said shoulder to prevent motion of the parts with reference to each other and in a direction perpendicular to the axis of rotation, and bolts passing loosely through openings in the hub and rail-engaging section and acting to secure the elements against separation in an axial direction.

4. A device of the class described comprising rail-engaging and hub sections, said hub section having a flange and said flange having a circumferential lateral shoulder of substantially greater diameter than the hub section proper, and said rail-engaging section having means engaging said shoulder to prevent motion of the parts in a direction perpendicular to the axis of rotation and means securing the parts together against separation in an axial direction, said means being applied at a point outwardly from said shoulder.

5. A device of the class described comprising a hub having a circumferential flange perpendicular to its axis, a rim having the usual rail-engaging flange, and having a portion which abuts that face of the hub flange which faces in the same direction as the rail-engaging portion of said rail-engaging flange, and said flange and rim having means securing them in quickly detachable co-axially centered load-supporting relation, said rim and hub flange having registered openings therein and bolts passing loosely through the openings and securing the parts together against motion in axial direction.

6. A device of the class described comprising a hub having a circumferential flange perpendicular to its axis, said flange having on one face a circumferential shoulder parallel with the axis, and a rim having the usual rail-engaging flange and having an opening the margins of which have a centering fit with said shoulder, the said rim having a portion which abuts that face of the hub flange which faces in the same direction as the rail-engaging portion of said rail-engaging flange, said rim and hub flange having openings therein, and bolts passing loosely through the openings and securing the parts together against motion in an axial direction.

In witness whereof I have hereunto set my hand this 18th day of October, 1928.

WALTER F. KASPER.